(12) United States Patent
Kaltchev (10) Patent No.: US 6,312,592 B1
(45) Date of Patent: Nov. 6, 2001

(54) CLARIFIER FOR LIQUIDS LADEN WITH SUSPENDED MATTER

(76) Inventor: Roumen Kaltchev, Les Fourches, 73000 Montagnole (FR)

( * ) Notice: Subject to any disclaimer, the term of this patent is extended or adjusted under 35 U.S.C. 154(b) by 0 days.

(21) Appl. No.: 09/615,227

(22) Filed: Jul. 13, 2000

(30) Foreign Application Priority Data

Jul. 13, 1999 (FR) .................................................. 99 09300

(51) Int. Cl.[7] .................................. C02F 1/24; C02F 9/02; B01D 36/00
(52) U.S. Cl. ...................... 210/202; 210/221.2; 210/259; 210/256; 210/257.1; 210/266; 210/275; 210/283; 210/293; 210/295
(58) Field of Search .................... 210/202, 221.2, 210/266, 259, 257.1, 256, 275, 283, 295, 293

(56) References Cited

U.S. PATENT DOCUMENTS

| | | | |
|---|---|---|---|
| 4,377,485 | 3/1983 | Krofta | .................................. 210/704 |
| 4,626,345 | * 12/1986 | Krofta . | |
| 4,931,175 | * 6/1990 | Krofta . | |
| 5,064,531 | * 11/1991 | Wang et al. . | |
| 5,069,783 | * 12/1991 | Wang et al. . | |
| 5,306,422 | * 4/1994 | Krofta . | |
| 5,320,750 | * 6/1994 | Krofta . | |

FOREIGN PATENT DOCUMENTS

WO 93/23335  11/1993 (WO) .
WO 94/21561   9/1994 (WO) .

* cited by examiner

Primary Examiner—Thomas M. Lithgow (57) ABSTRACT

Clarifier for liquids laden with suspended matter, comprising:
an outer, first, cylindrical tank (4),
a central, second, cylindrical tank (1) for collecting the filtered liquid, roughly coaxial with the first;
an intermediate tank (2), formed between the outer tank (4) and the central tank (1) and roughly coaxial therewith;
structure (19) for the feed of pressurized backwash liquid to the filter medium (14);
a hood (26) for recovering the washing liquid after it has passed through the filter medium (14);
a rotary bridge (8) which can rotate above the collection of cylindrical tanks (1, 2, 4),
a compartment for introducing the liquid that is to be clarified, this compartment being positioned between the intermediate tank (2) and the central tank (1) and feeding the outer tank (4) centrally with liquid laden with suspended matter, the said compartment being itself fed with liquid that is to be clarified from the outside via a number of inlets (3).

11 Claims, 6 Drawing Sheets fig. 1 fig. 2 fig. 3 fig. 6 fig. 7 fig. 4 fig. 5 fig. 8 fig. 9

CLARIFIER FOR LIQUIDS LADEN WITH SUSPENDED MATTER

TECHNICAL FIELD

The invention relates to a clarifier for liquids laden with suspended matter, employing two liquid/solid separation techniques: dissolved air flotation and filtration on a filter medium (sand, anthracite or some other backwashable filter medium). The clarifier according to the invention can be used for separating suspended matter, hereinafter termed SM, contained in a liquid, and to do so in two stages:

first of all, by flotation—natural flotation (if its density is lower than that of the liquid), or in combination with the dissolved air flotation technique;

and then by filtration on a backwashable filter medium.

The clarifier according to the invention is particularly intended for clarifying a liquid effluent laden with SM.

In both these instances (natural flotation or dissolved air flotation) the construction and principle of operation of the clarifier according to the invention remain the same.

PRIOR ART

The fundamental techniques employed in the clarifier according to the invention are known per se.

Natural flotation and more particularly dissolved air flotation which uses the propensity of microbubbles of a gas to adhere to the particles in suspension (the SM) and cause them to rise to the surface of the liquid. This technique is often combined with various chemical treatments that cause the SM to clump together.

Filtration on a filter medium (sand or the like).

Backwashing of the filter medium.

The combined use of these techniques in a circular apparatus is also known. The first clarifier of this type was installed in the United States in 1980. Since then, this kind of clarifier has known various different designs, sold under the trade names of SANDFLOAT (SAF), SEDISANDFLOAT (SASF) and SANDFLOAT BP (SAF BP).

In summary, the points that these known clarifiers have in common are as follows. The clarifier consists of a circular tank in which the liquid that is to be clarified is introduced. The first stage of clarification is performed by dissolved air flotation which allows most of the SM to be moved away up to the surface of the liquid. >From the surface of the liquid, the floated matter is recovered by a spiral scoop and removed from the apparatus. The partially flotation clarified liquid drops to the bottom of the tank where it is filtered on a bed of sand or the like (the filter medium) arranged near the bottom of the tank of the apparatus. A device for recovering the filtered liquid placed under the filter medium allows this liquid to be removed to a space located under the bottom of the tank or to an external collector. The filter medium is placed in several independent sectors separated by vertical walls. The filter medium is backwashed sector by sector using liquid filtered by the other sectors. A washing hood suspended from the rotary bridge allows the washing liquid to be collected and recycled to the inlet of the apparatus so that the washing sludge is mixed with the incoming liquid that is to be treated and refloated. This clarifier is described, for example, in document U.S. Pat. No. 4,377,485.

The differences between these known clarifiers lie in the way the techniques used are performed and, more particularly, in the way in which the clarifier is fed with the liquid that is to be treated (radial feed or central feed);

the way in which the filtered liquid is recovered (towards a space that is common to all the sectors or separately from each sector to an external collector);

the devices used to collect the filtered liquid (through meshes, suction strainers or using slotted tubular collectors);

whether or not a device is fitted for recovering the first filtrate;

the way in which the filter medium is backwashed (by suction up through the washing hood or under pressure from a central tank using a pump, or by pipework outside the tank feeding into each sector through a series of valves).

Each of these known clarifiers has its advantages and its disadvantages. Hence, the first of the clarifiers mentioned (the SAF) uses a radial method of feeding in liquid that is to be clarified. In this configuration, the entire flow of liquid to be clarified is introduced along a radius. Feed is by means of a device fitted on the rotary bridge and which is fed with liquid to be clarified via a rotary seal located along the axis at the centre of the apparatus. Distribution is according to the <<zero-velocity>> principle: the liquid emerges from the radial distribution device at the same speed as the speed at which the said device (and therefore the rotary bridge) retreats. What is more, this feed device is supplemented by a flocculator fitted on the bridge. This system for introducing the liquid that is to be clarified proves to be too unwieldy, too expensive and finally ill-suited to the function aimed at allowing flotation clarification prior to filtration. The problem is that at every moment, the entire flow of liquid for clarification is introduced along a radius in a rotary manner as in a circular channel, whereas filtration on the filter medium takes place uniformly and evenly across the entire area of the filter. It is obvious that those parts of the filter (the sectors) located in close proximity to the point at which the liquid that is to be clarified is introduced thus receive quantities of liquid which are practically unclarified by the flotation technique (or at least have not been well-clarified) because turbulence at the time of introduction is great and flotation is not very effective. In consequence, the filter clogs too quickly, having a prohibitive detrimental effect on the operation of a clarifier of this kind.

The second apparatus in this family, the SASF, makes it possible to overcome this drawback because it is fed centrally from a central tank, so that the flow of liquid to be clarified is spread uniformly over the entire filter area. By contrast, the backwashing of the filter sectors is, in this instance, performed by sucking up through the washing hood filtered liquid in a space located under the said sectors and common to all the sectors. In effect, backflow washing by suction through the washing hood poses problems of washing efficiency because the washing pump is "choked" on the suction side and its characteristic is readily moved off the operating curve. In consequence, the greater the extent to which the filter medium is clogged, the more the washing pump is "choked" on the suction side and the more the washing flow rate becomes unstable and tends to drop. The filter medium therefore becomes increasingly clogged and the pressure drops across the filter increase in proportion until the filter medium is completely clogged.

The last of the clarifiers mentioned (the SAF BP) does not present this problem because the backwashing of the filter medium is done under pressure. The major disadvantage of this apparatus is essentially of an economical order. This is because the external pipework, the high number of automatic shut-off valves, the devices for controlling these valves, the feedback control and the relatively sophisticated automation equipment required to operate it make the entire plant rather expensive.

BRIEF DESCRIPTION OF THE INVENTION

The device according to the invention makes it possible to employ a more simple and less expensive design of this type of combined clarifier, by using the aforementioned two separation techniques, namely flotation and filtration on filter medium under conditions best suited to each of them, while at the same time avoiding the drawbacks recalled hereinabove. Specifically, it avoids the risks of malfunction of the prior art devices of this family by combining a central feed mode with a pressurized means of washing the filter medium without exhibiting the significant economical drawbacks entailed by external collectors for separately recovering the clarified liquid from each sector and the collectors for feeding the sectors with liquid for backwashing.

To this end, the clarifier according to the invention comprises a compartment for introducing the liquid that is to be clarified, this compartment being positioned between an intermediate tank and the central tank (for collecting the filtered liquid) and feeding the outer tank centrally with liquid laden with suspended matter, the said compartment being itself fed with liquid that is to be clarified from the outside via a number of inlets.

According to the invention, the said compartment feeds the outer tank roughly along its entire circumference. This compartment may consist of the intermediate tank itself, which feeds into the outer tank by a simple overflow effect, thus giving rise to a central feed with liquid to be clarified.

The device for generating the microbubbles of gas needed for flotation is not described because it is considered as being known. By way of indication, the pressurized liquid comprising the microbubbles is introduced into the pipework feeding into the clarifier.

The clarifier comprises a cylindrical tank (the outer tank) equipped with a runway at the top and a rotary bridge supporting a spiral scoop for extracting the floated matter and a hood for recovering the washing liquid. A funnel with pipework for removing the floated matter is placed along the axis of the clarifier. Two concentric cylindrical tanks are arranged at the centre of the clarifier tank, one of them being used for introducing and distributing the liquid to be clarified into the clarifier and the other (the one at the centre) being used for collecting the filtered liquid. On the outside of these two central tanks, the bottom of the clarifier tank is divided into sectors by vertical walls which extend up to a certain level below the surface of the liquid. The filter medium is arranged in each sector, filling it up to a level below the level of the edges of the vertical walls that delimit the sectors.

Each sector has a double bottom:
- a first, upper, bottom equipped with suction strainers (or any other device for retaining filter medium) and supporting the filter medium;
- a second, lower, bottom, delimiting a volume in which the filtered liquid from each sector is collected.

A pipe conveys the filtered liquid collected between the two bottoms of each sector to the cylindrical tank located at the centre of the clarifier. A backwash pump is suspended from the rotary bridge inside the tank for collecting the filtered liquid located at the centre of the clarifier, by means of a support. A lifting device allows the washing pump to be raised while the rotary bridge is rotating and lowered when the bridge stops, positioning the washing hood over the sector that is to be washed. The washing pump is positioned in such a way that it fits onto the pipe for collecting the filtered liquid from the sector that is to be washed.

The clarifier also comprises a series of devices for positioning the washing hood over the sector that is to be washed and devices which ensure that the said hood contacts the walls of the said sector. It also comprises devices for feeding electricity to the washing pump, geared motor units for driving the rotary bridge and the spiral scoop, and other control members installed on the bridge.

The way in which the invention may be realized and the advantages it affords will become better apparent from the following embodiments which are given by way of non-limiting indication with the support of the appended figures.

DETAILED DESCRIPTION OF THE CLARIFIER ACCORDING TO THE INVENTION

The clarifier according to the invention first of all comprises an outer cylindrical tank (4) defining the chamber for the treatment of the liquid laden with suspended matter that is to be treated.

According to a first feature of the invention, the clarifier further comprises a central cylindrical tank (1) and an inner shell ring (2) installed one inside the other at the centre of the clarifier and concentrically with the outer tank (4). In the remainder of the description, the reference (2) will be used indiscriminately to denote the shell ring (2) and an intermediate tank, this intermediate tank being defined in space by the shell ring (2) and the cylindrical vertical wall defining the central tank The liquid to be clarified (previously mixed with the pressurized liquid containing the microbubbles and possibly some chemical products for conditioning purposes) is introduced into the space between the central tank (1) and the shell ring (2) by one or more feed pipes (3). From this space, the liquid to be clarified is distributed centrally to the entire circumference of the outer tank (4) in the flotation space delimited by the shell ring (2) and the outer cylindrical wall defining the clarifier tank (4).

Figure 1:
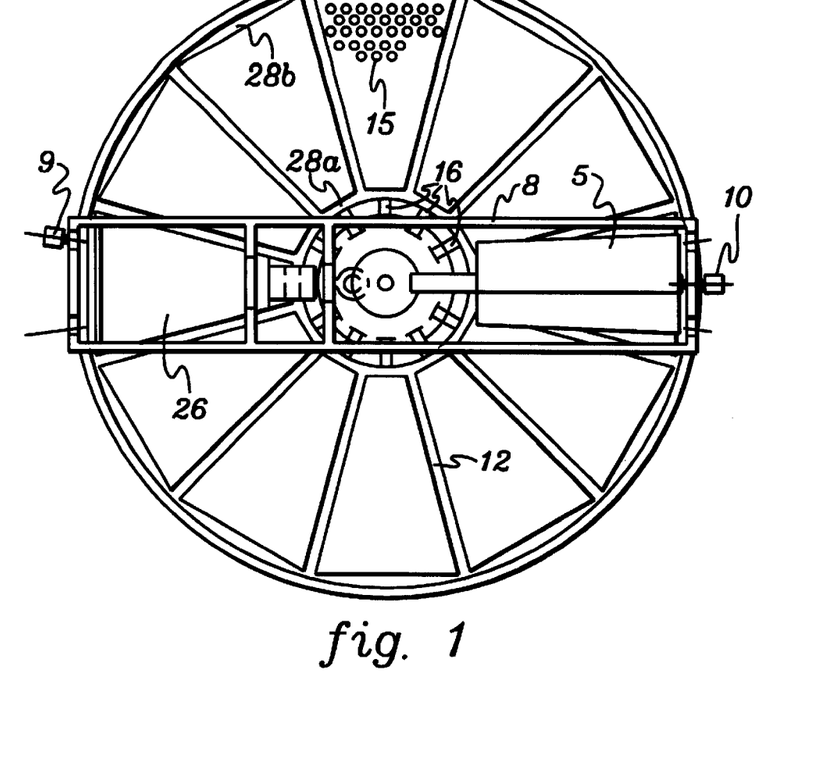
FIG. 1 is a diagrammatic depiction in plan view of the clarifier according to the invention.
Figure 2:
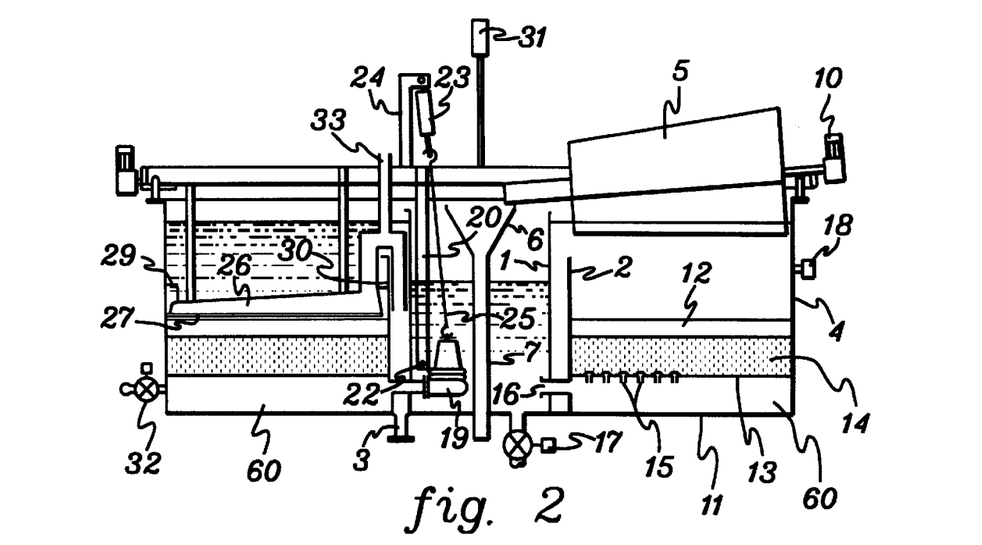
FIG. 2 is a diagrammatic depiction in vertical section of the clarifier according to the invention.

In the embodiment of the invention described in conjunction with FIGS. 1 and 2, the outer tank (4) is fed with liquid to be clarified by the overflowing of the said liquid over the shell ring (2), thus giving a roughly uniform distribution of the said liquid throughout the entire treatment volume defined by the outer tank (4).

A first separation of the suspended matter (SM) contained in the liquid takes place in the flotation space thus defined. The liquid clarified by flotation drops simply under gravity towards the bottom of the clarifier where it is filtered through a filter medium. The SM rises to the surface of the liquid and forms a layer of floated matter. This layer is scooped off using a spiral scoop (5), which despatches the floated matter into a funnel (6) formed inside the central tank (1), and from which it is removed from the clarifier by pipework (7). The spiral scoop (5) is mounted on a rotary bridge (8) which can rotate over the collection of tanks (1, 2, 4). The rotary bridge (8) is rotated by means of a geared motor unit (9). The spiral scoop (5) is rotated by means of a geared motor unit (10).

The filtration device is placed under the flotation space and is formed as follows.

The lower part of the outer tank (4) of the clarifier is divided into a number of ring sectors by means of vertical walls (12) which extend up to a certain level in the flotation space. Furthermore, the outer tank (4) has two bottom walls - a first bottom (11), surmounted by a second bottom (13) arranged a certain distance above the bottom (11) and roughly parallel thereto. These two bottoms in conjunction with the vertical walls (12) and for each ring sector, define a receptacle (60) intended to receive the filtered liquid. Furthermore, the bottom (13) is intended to act as a support for the filter medium (14) which typically consists of sand. The bottom (13) is also fitted with suction strainers (15) intended to hold the filter medium (14) on the said bottom (13) while at the same time allowing the filtered liquid to flow into the receptacles (60).

The filtered liquid is removed from the receptacles (60) towards the central tank (1) by means of pipework or a collector (16) (each sector has one of these). The liquid thus collected in the central tank (1) is removed from the clarifier by an automatic regulating valve (17). This automatic valve (17) maintains the liquid level in the flotation space by means of a pressure detector (18) positioned within the said space in the outer tank (4) and immersed in the liquid to be clarified. Pressure drops across the filter medium (14) are compensated for by the difference between the liquid level in the flotation space (upstream of the said filter medium) and the level of filtered liquid in the central tank (1) (downstream of the filter). This difference in level is regulated automatically by the level-regulating device consisting of the valve (17) and pressure detector (18) assembly.

Figure 5:
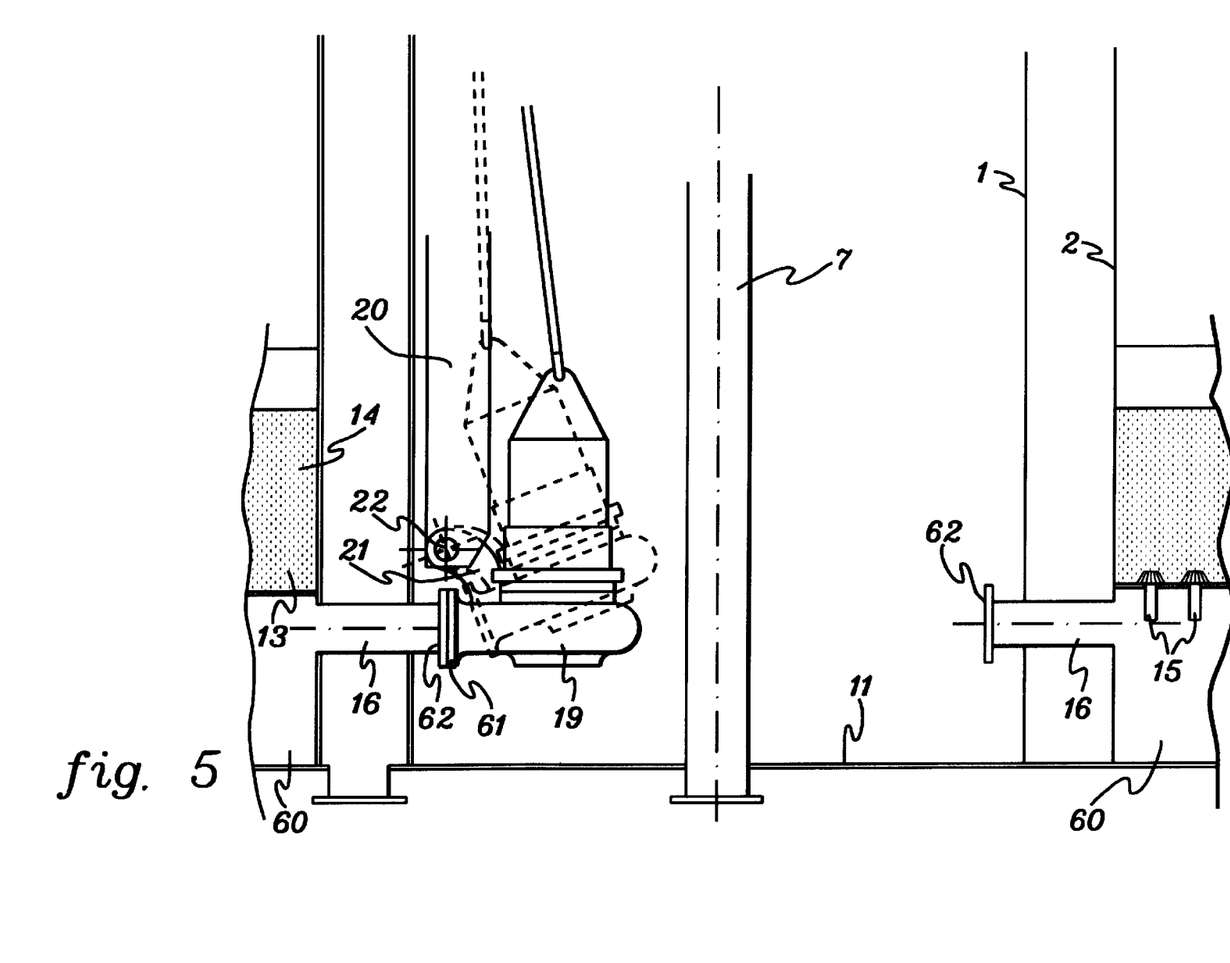
FIG. 5 is a diagrammatic depiction in vertical section of the detail marked in FIG. 4.

The filter medium is backwashed sector by sector without interrupting the operation of the clarifier, and this is performed as follows:

A washing pump (19) is suspended from the rotary bridge (8) inside the central tank (1) by means of a support (20) secured to the bridge (8) and a support (21) articulated to the lower end of the said support (20) at an articulation spindle (22). The pump (19) is secured to the said support (22) and is intended to be immersed in the clarified liquid stored in the central tank (1). The pump (19) can therefore pivot about the spindle (22), as shown in FIG. 5. It is therefore cantilevered from the spindle (22) with respect to the support.

A lifting device made up of a ram (23) fixed to the rotary bridge (8) by means of a support arm (24) and a tie rod (25) connecting the ram (23) and the pump (19) allows the pump (19) to be pivoted about the spindle (22). When the bridge (8) is rotating, the pump (19) is raised into the position shown in dotted line in FIG. 5, and the filtered liquid for all the sectors flows into the tank (1) via the collectors (16). In this position, the pump (19) does not touch the flanges of the said collectors (16) and can therefore rotate freely. When a sector is to be backwashed, the rotary bridge (8) stops so that the washing hood (26), suspended from the said bridge, lies precisely vertically over the sector in question.

An inflatable pneumatic seal (27) formed on the lower peripheral edge of the hood (26) is inflated and creates a seal between the hood (26) and the walls (12) of the sector in question, and the shelves (28a) and (28b) of the said sector. The hood (26) is held in the operational position by stops (29) and (30) formed within the tank (4) as can be seen clearly in FIG. 1. Thus, the sector that is to be washed is isolated from the flotation space for better washing efficiency. The washing pump (19) is positioned in such a way that at the time the bridge (8) stops, its outlet flange (61) is just over the flange (62) of the collector (16) of the sector that is to be washed. Once the hood (26) has been placed over the sector that is to be washed, the device for lifting the pump (19) causes it to pivot until it reaches the position depicted in solid line in FIG. 5, that is to say until its delivery flange (61) is pressed against the flange (62) of the collector (16). Sealing between the flange (62) of the collector (16) and the delivery flange (61) of the pump (19) is achieved by the weight of the pump which, given the position of the pivot spindle (22), causes the pump to press against the collector (16) to a certain extent. When the pump is pressing against the collector (16), it is switched on to draw filtered liquid from the tank (1) out of the receptacles (60) and send it under pressure into the receptacle (60) corresponding to the sector that is to be washed. The liquid washing the filter medium becomes laden with washing sludge and is then collected under the hood (26) and finally returned to the space between the central tank (1) and the intermediate tank (2) where it can be mixed back in with the liquid that is to be clarified.

This washing device makes it possible to avoid any automatic valves for isolating the sectors, or the automatic valves for directing the washing liquid towards the sector that is to be washed and any pipework for collecting the filtered liquid or for feeding washing liquid, and all the accessories and automation involved in controlling these valves.

Once the sector has finished being washed, the pump (19) is switched off and raised into the raised position (as shown in chain line in FIG. 5), the pneumatic seal (27) of the hood (26) is deflated and the bridge (8) moves on towards another sector.

The electrical and possibly pneumatic supply to the various items of equipment mounted on the rotary bridge (8) is afforded by a rotary contactor (31) and possibly a rotary pneumatic seal associated with the said contactor.

The various constituent parts of the clarifier according to the invention may be produced in various ways. Thus, the feed of liquid that is to be clarified to the clarifier may be via one or more points of entry (3) introducing the liquid that is to be clarified into the space between the central tank (1) and the intermediate tank (2). Furthermore, the feed space between the central tank (1) and the intermediate tank (2) may be replaced by a circular channel, the bottom of which is located above the bottom (11), this channel fulfilling the same function as the aforementioned space, that is to say being intended to allow the floatation space defined by the outer tank (4) to be fed centrally.

Figure 3:
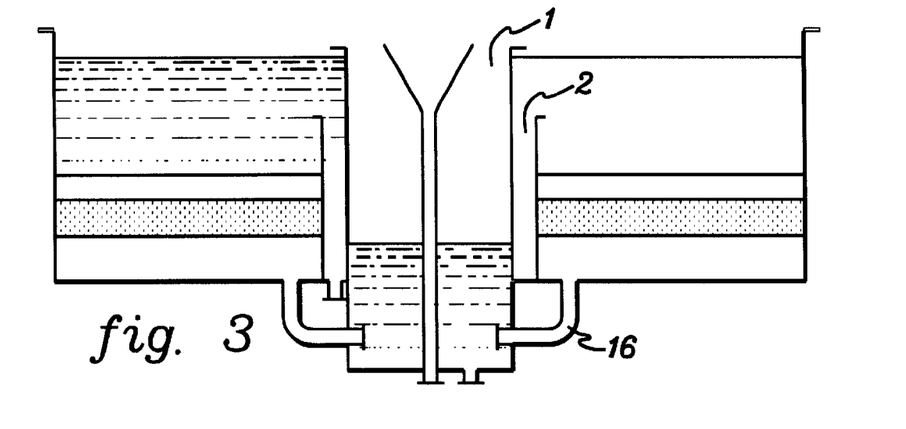
FIG. 3 is a diagrammatic depiction of an alternative form of the central part of the clarifier according to the invention.
Figure 4:
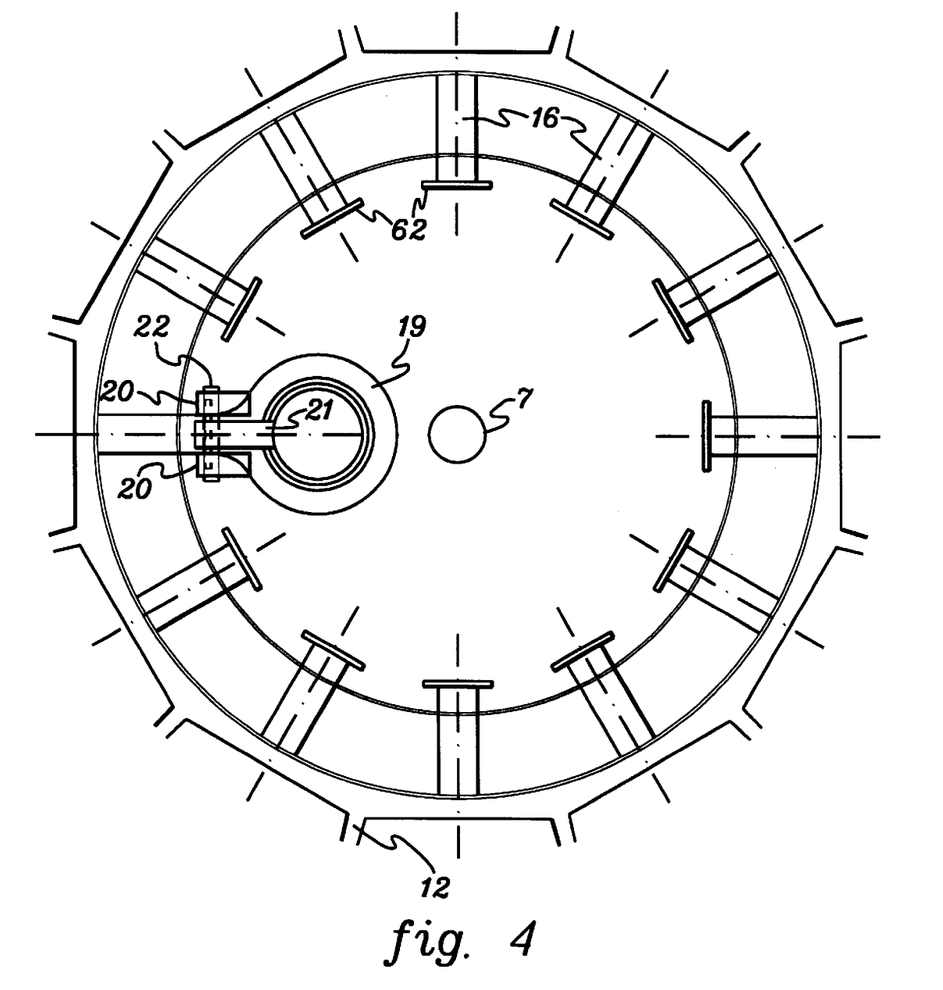
FIG. 4 is a diagrammatic depiction in plan view of the central part and of the system for washing the clarifier according to the invention, equipped with a member for coupling the washing pump and the collectors using the weight of the pump.

The bottom of the central tank (1) may be situated at the same level as the bottom (11) of the outer tank (4) as depicted in FIG. 2, or may alternatively be situated lower down to make it possible to increase the pressure drops across the filter medium (14), as depicted diagrammatically in FIG. 3.

The number of sectors may vary, the only constraint being inherent to the washing flow which has to be absorbed by the other sectors.

The suction strainers (15) may be replaced by some other member for holding the filter medium (14) and fulfilling the same function.

The filter medium (14) may consist of a single material or may alternatively consist of two different layers each having its own specific weight and particle size (conventional two-layer filter). In this case, the washing pump may be electrically connected to a frequency variator allowing the washing rate needed to separate the two layers to be varied.

Decompaction of the filter medium (14) using compressed air may also be envisaged by means of an automatic valve (32) which sends air into the receptacles (60) defined by the bottoms (11) and (13). In such a case, it is appropriate to envisage suitable suction strainers (15). The air from the decompaction phase then emerges via the vent (33) of the pipe of the hood (26).

The lifting ram (23) and the tie rod (25) of the device for lifting the pump (19) may be replaced by any other device fulfilling the same function.

Finally, the submersible washing pump (19) may be replaced by some other type of pump (for example a pump of the vertical axis type), associated with some other lifting or pivoting device providing a connection between the delivery pipe of the said pump and the collectors (16).

Figure 8:
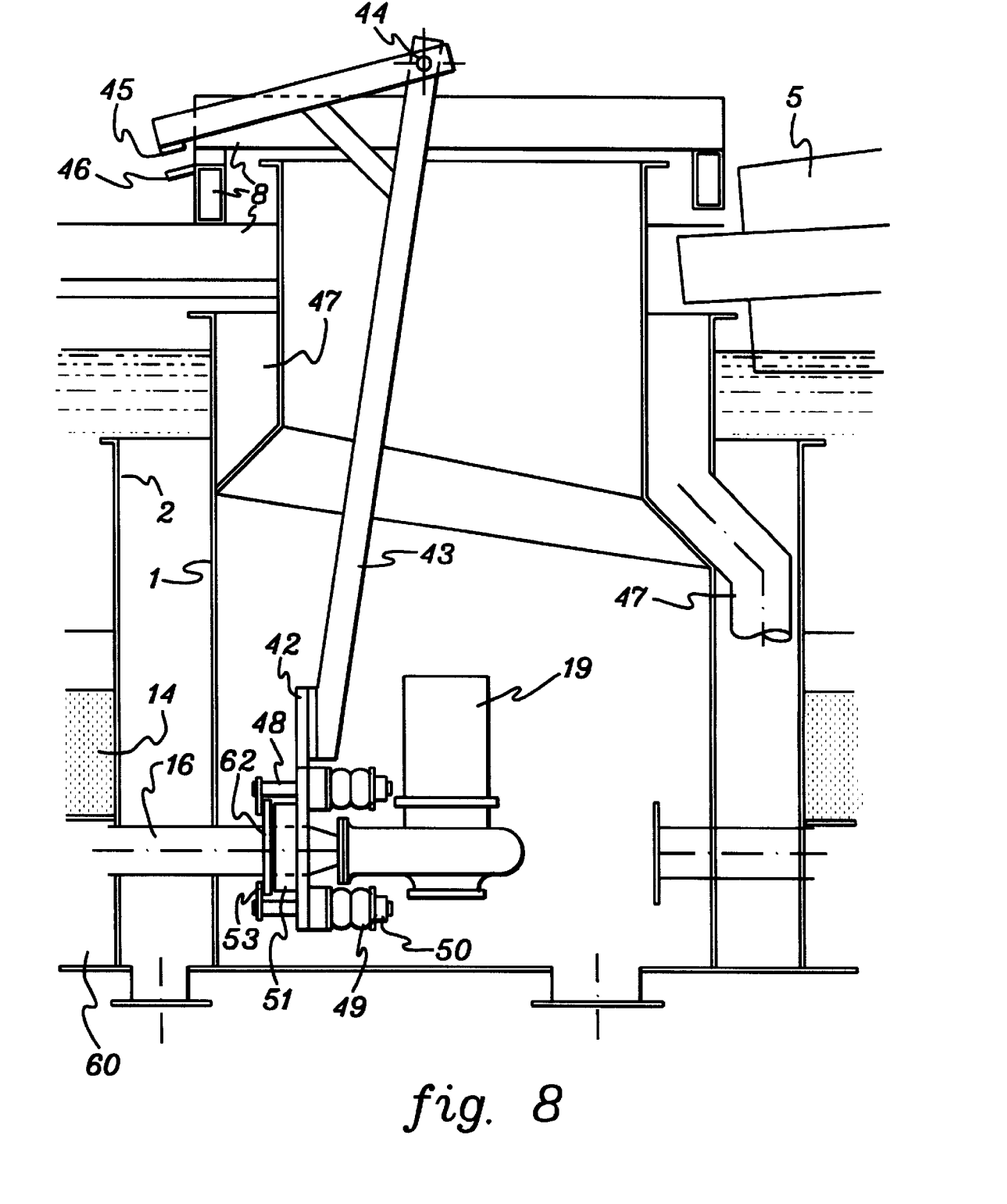
FIG. 8 is a diagrammatic depiction in plan view of the central part and of the washing system of another alternative form of the clarifier according to the invention equipped with a member for coupling the washing pump and the collectors using pneumatic rams.
Figure 9:
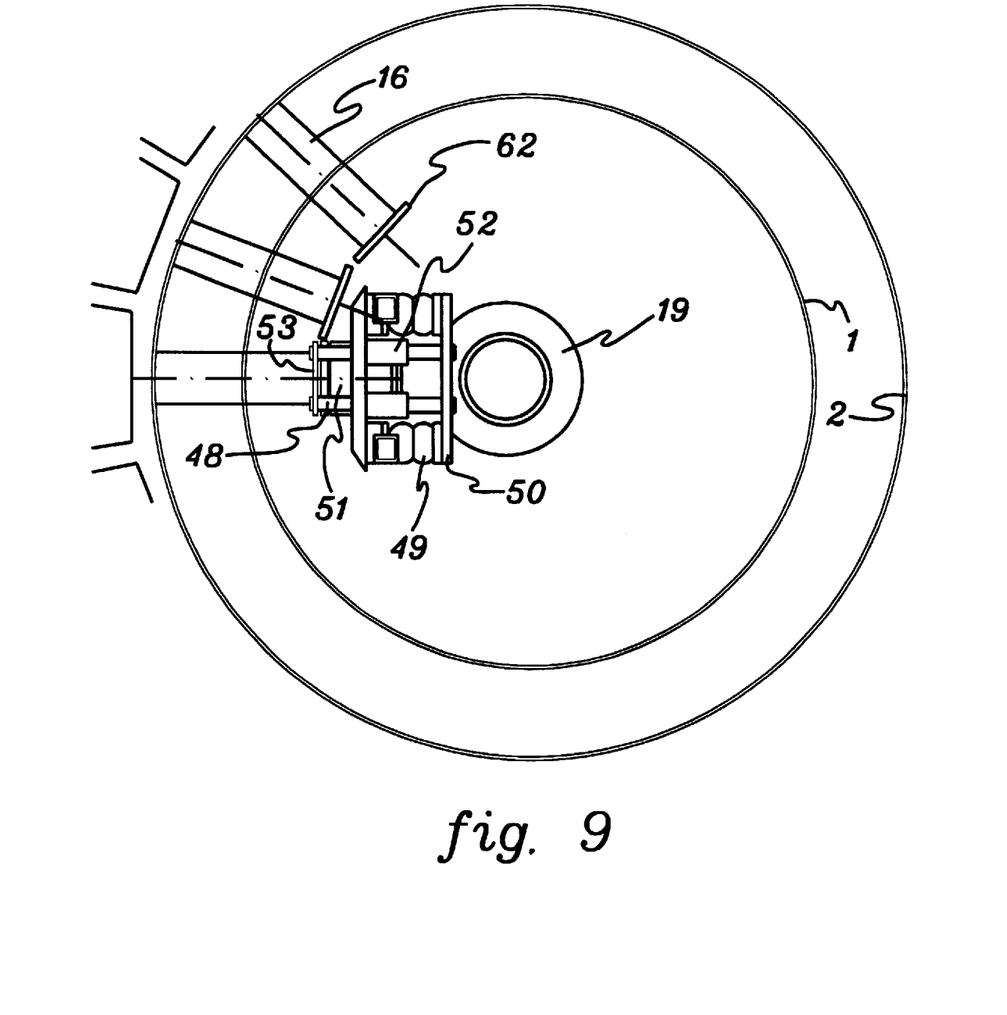
FIG. 9 is a diagrammatic depiction in vertical section of a detail marked in FIG. 8.

A second alternative form of clarifier according to the invention has been depicted in FIGS. 8 and 9. This alternative form differs from the previous embodiment essentially in the way that the washing pump (19) and the collectors (16) are coupled. While, in the previously-described version, the coupling was by virtue of the pump (19) resting under its own self weight, in this second embodiment, the coupling is achieved by the coupling flange of the said pump pressing against the flange of the collector (16), the said pressing being provided by an external source of energy.

The pump (19) is suspended from the rotary bridge (8) via a plate (42) secured to a support arm (43), the latter being articulated to a horizontal spindle (44) secured to the bridge (8). The assembly comprising pump (19) and support (42, 43) pivots about the spindle (44) so as to allow the sealing flange (51) (which is also fixed to the plate 42) to move away from or closer to the coupling flange (62) of the collector (16). The spindle (44) is positioned in such a way that the centre of gravity of the assembly comprising pump (19) and support (42, 43) always lies between the vertical plane passing through the spindle (44) and the coupling flange (62) of the collector (16). Thus, the weight of the pump (19) tends always to cause the assembly to pivot towards the said collector (16) and, in the example described in FIG. 8, to the left. Sliding bars (48) sliding in guides (52) allow the assembly supporting the washing pump (19) to catch on the coupling flange (62) of the collectors (16) via hooks (53) and allow the said pump to be brought up closer to the flange (62) so as to create a seal at this point.

Four rams (49) exert pressure on the opposite side of the plate (42) to the collector (16) and their point of action is the end (50) of the sliding bars (48).

The floated matter scooped out by the scoop (5) is collected in a chute (41) and removed by a pipe (47) ending at the intermediate tank (2).

The pump (19) and the coupling flange (62) of the collectors (16) are coupled as follows:

The four rams (49) are fed with compressed air (or some other fluid) in parallel (the feed is not shown in the diagram). Under the action of the compressed air, the rams act on the bars (48) which, in their turn, pull the hooks (53) towards the plate (42). The sliding bars (48) slide in the guides (52) thus allowing the hooks (53) to hook onto the coupling flange (62) of the collector (16) and then pull the plate (42) towards the said flange (62) until the sealing flange (51) secured to the plate (42) and located coaxial with the flange (61) of the pump bears against the said flange (62). The washing pump (19) is then switched on. Once washing is completed, the washing pump is stopped and uncoupling is performed in the reverse manner. Thus, the rams (49) are placed in depression (using a vacuum pump or the like) so that they deflate and retract. First of all, the plate (42) detaches from the flange (62) of the collector (16) because the arrangement of the centre of gravity of the pump/support assembly tends to move it away from the said flange. In fact, the plate (42) retreats (in FIG. 8, moves to the right) until a projection (45) formed at the end of an arm secured to the support (43) and also articulated to the spindle (44) rests against a stop (46) secured to the rotary bridge (8). In this way, the possible travel between plate (42) and coupling flange (62) of the collector (16) is limited. Next, as the rams continue to retract, the hooks (53) unhook from the coupling flange (62) and move away from it. Thus, the sealing flange (51) and the hooks (53) find themselves far enough away from the coupling flange (62) of the collectors (16) on each side as to allow the rotary bridge (8) and therefore the pump (19) to rotate towards another sector that needs to be washed.

By way of example, the same type of coupling device can be produced in various ways. Thus, the four rams (49) may be replaced by a single annulus-shaped ram, with the pump delivery (not depicted) passing along its axis.

The rams can use pneumatic or hydraulic energy. They may be replaced by an electromagnetic device which fulfils the same function.

The coupling may be achieved by some other device that causes the washing pump (19) to pivot with respect to the spindle (44) so as to move the coupling flange (62) towards and away from the collectors (16).

Finally, in an alternative form which has not been depicted, the support (43) may be fixed to the rotary bridge (8) rigidly (as in the first alternative form shown in FIG. 5) so that the pump (19) always remains the same distance away from the coupling flange of the collectors (16). In this case, an inflatable seal housed in the sealing flange (51) may create the contact and the seal between the said flanges.

Figure 6:
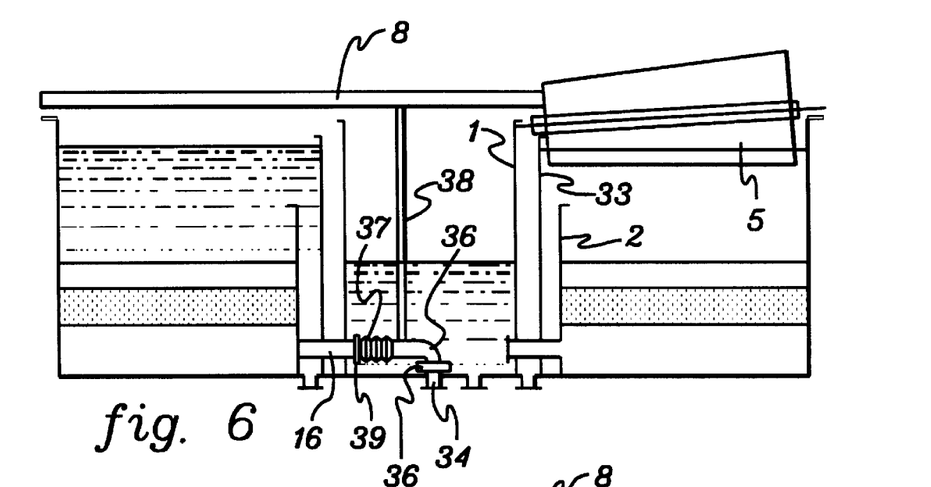
FIG. 6 is a view similar to FIG. 3 of a second alternative form of the clarifier according to the invention.

A third alternative form of the clarifier according to the invention is depicted diagrammatically in FIG. 6.

In this alternative form, according to a first feature, the clarifier is equipped with an additional cylindrical wall (33) arranged between the walls of the tanks (1) and (2). The space between the walls (1) and (33) is intended to collect the floated matter from the scoop. The liquid for washing the sectors arrives from the outside (under pressure) via the immobile pipe (34) in the rotary pipe (35). This pipe (35) is secured to the rotary bridge (8) via a support (38). Rotation of the pipe (35) with respect to the pipe (34) is provided for by a rotary seal (36). The end of the pipe (35) is fitted with a telescopic seal (37) (bellows or the like) which allows the flange (39) located at the end of the rotary pipe (35) to be moved forward towards the collectors (16) so that the flange (39) can be pressed against the coupling flange (62) of the collector (16) and a seal thus achieved during washing. By contrast, this seal (37) allows the said end to be withdrawn from the flange (62) of the collectors towards the rotary seal (36) while the bridge is rotating. The control of this telescopic seal (37) is not shown because it has nothing directly to do with the invention. Effectively, the end of the rotary pipe (35) may be pressed against the collectors (16) in a number of ways.

Figure 7:
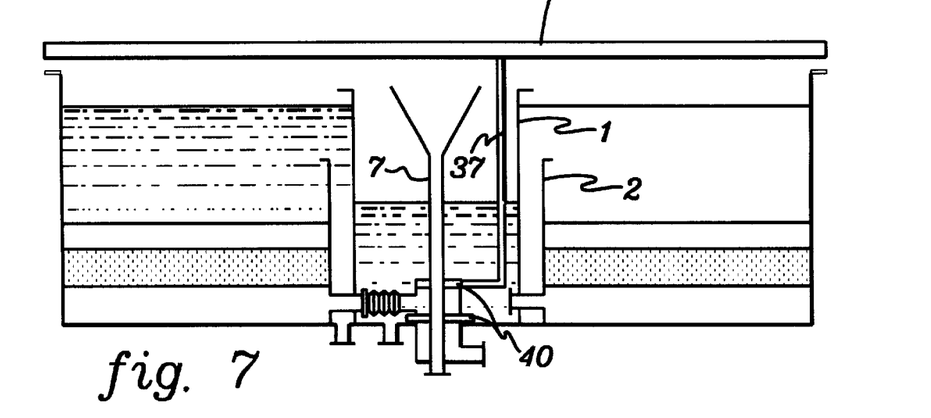
FIG. 7 is a view similar to FIGS. 3 and 6 of a third alternative form of the clarifier according to the invention.

A fourth alternative form of the clarifier according to the invention is depicted diagrammatically in FIG. 7. The difference with respect to the previous alternative form lies essentially in the absence of the wall (33). The floated matter is collected in the central funnel (6), as it was in the clarifier shown in FIGS. 1 and 2, but the washing system is fed from the outside via a double rotary seal (40) designed in such a way that the pipework (7) for the removal of the floated matter can pass along its axis.

For the remainder, the two alternative forms of the clarifier according to the invention shown in FIGS. 6 and 7 are identical on the whole to the basic version shown in FIGS. 1 and 2.

The entire benefit of the clarifier according to the invention in the context of the treatment of effluent: liquid and residual water, will consequently be appreciated. This is because, aside from optimizing the operation of the apparatus, it is possible to significantly simplify its construction and to reduce its cost.

What is claimed is:

1. Clarifier for liquids laden with suspended matter, combining techniques of flotation clarification and clarification by filtration on backwashable filter medium and comprising:
   an outer, first, cylindrical tank (4) which has a number of compartments in the form of ring sectors, the said compartments each comprising a horizontal divider or bottom (13) defining, with the bottom (11) of the tank (4), at least one receptacle (60) for the filtered liquid, the said horizontal divider (13) acting as a support for a filter medium (14) and being fitted with means (15) intended to allow the liquid after filtration through the said filter medium, to pass into the said receptacles (60);
   a central, second, cylindrical tank (1) for collecting the filtered liquid, roughly coaxial with the first and at least one collector for connecting the at least one receptacle with said central tank(1);
   an intermediate tank (2), formed between the outer tank (4) and the central tank (1) and roughly coaxial therewith;
   a means (5) for recovering and collecting the floated matter;
   means (19) for the feed of pressurized backwash liquid to the filter medium;
   a hood (26) for recovering the washing liquid after it has passed through the filter medium (14);
   a rotary bridge (8) which can rotate above the collection of cylindrical tanks (1, 2, 4) and from which are suspended, on the one hand, the means (5) for recovering and collecting the floated matter and, on the other hand, the hood (26) for recovering the liquid used for backwashing the filter medium, and finally the said means (19) for feeding pressurized washing liquid;
characterized in that it further comprises a compartment for introducing the liquid that is to be clarified, this compartment being positioned between the intermediate tank (2) and the central tank (1) and feeding the outer tank (4) centrally with liquid laden with suspended matter, the said compartment being itself fed with liquid that is to be clarified from the outside via a number of inlets (3).

2. Clarifier according to claim 1, characterized in that the said introducing compartment feeds the outer tank (4) roughly along its entire circumference.

3. Clarifier, according to claim 1, characterized in that the said compartment for introducing the liquid that is to be clarified consists of the intermediate tank (2).

4. Clarifier according to claim 3, characterized in that the said outer tank (4) is fed with liquid that is to be clarified by overflow over the outer wall of the intermediate tank (2).

5. Clarifier according to claim 1, characterized in that it further comprises means for connecting and disconnecting the means (19) for feeding pressurized washing liquid to and from the at least one collector (16) departing from the filtered liquid receptacle (60), the said means for connecting and disconnecting also being suspended from the rotary bridge (8) and immersed in the central tank (1).

6. Clarifier according to claim 1, characterized in that the hood (26) is fitted with means capable of sealing each ring-sector compartment of the outer tank (4) so as to allow the sector in question to be isolated from the rest of the flotation chamber and the backwashing liquid laden with sludge from the washing of the filter medium to be removed from each ring-sector compartment into which the liquid to be clarified is introduced.

7. Clarifier according to claim 6, characterized in that the sectors are defined by vertical walls and shelves (28a) and (28b) and the hood (26) is fitted with an inflatable pneumatic seal (27) at its lower edge, inflation of which creates the seal between the hood (26), the vertical walls (12) defining the sectors and the shelves (28a) and (28b) of each of the said sectors, and in that each of the said sectors has stops (29) and (30) capable of limiting the heightwise travel of the said hood (26).

8. Clarifier according to claim 1, characterized in that the central tank (1) is fitted with a valve (17) for automatically regulating the level of liquid contained in the central tank (1) according to the pressure drops across the filter medium, and the operation of which is correlated with a pressure detector (18) formed inside the outer tank (4) and immersed in the liquid that is to be clarified, so as to allow the level of liquid to be clarified within the said outer tank (4) to be regulated.

9. Clarifier according to claim 1, characterized in that the means for feeding the filter medium with backwash liquid consist of a pump (19), the said pump being immersed in the central tank (1) and being articulated at an articulation pin (22) attached to a support arm (20) originating at the rotary bridge (8), the said pump also being fitted with coupling members intended to allow the said pump to be actually connected in the region of a coupling flange (62) of the at least one collector (16), the leaktightness of the said coupling being inherent to the weight of the pump cantilevered from the articulation pin (22).

10. Clarifier according to claim 1, characterized in that the means for feeding the filter medium with backwash liquid comprises a pump (19), the said pump being immersed in the central tank (1), the said pump being secured to a support arm (42, 43) secured to the rotary bridge (8) and also being fitted with coupling means employing a source of pneumatic, hydraulic, mechanical or electromagnetic energy intended to allow the said pump to be actually connected to the coupling flange (62) of the at least one collector (16).

11. Clarifier according to claim 1, characterized in that the means for feeding the filter medium with backwash liquid consist of a pipe (35) rotating as one with the rotary bridge (8) and fed with pressurized washing liquid from outside the clarifier by means of a rotary seal (36, 40), the said rotating pipe (35) being equipped with means (37) of connection and disconnection to and from the said at least one collector (16).

* * * * *

UNITED STATES PATENT AND TRADEMARK OFFICE
CERTIFICATE OF CORRECTION

PATENT NO. : 6,312,592 B1
DATED : November 6, 2001
INVENTOR(S) : Kaltchev

Page 1 of 1

It is certified that error appears in the above-identified patent and that said Letters Patent is hereby corrected as shown below:

<u>Column 10,</u>
Line 18, before the word filtered, insert -- at least one --

Signed and Sealed this

Fourteenth Day of May, 2002

Attest:

Attesting Officer

JAMES E. ROGAN
Director of the United States Patent and Trademark Office